(12) United States Patent
Martin et al.

(10) Patent No.: US 6,532,455 B1
(45) Date of Patent: Mar. 11, 2003

(54) METHOD AND SYSTEM FOR CONTENT-BASED DOCUMENT SECURITY, ROUTING, AND ACTION EXECUTION

(75) Inventors: Paul E. Martin, Columbia, MD (US); Kenneth S. Davis, Alexandria, VA (US); Myo Kyaw, Baltimore, MD (US); Arulnambi Kaliappan, Columbia, MD (US); Dmitriy F. Shvadkiy, Baltimore, MD (US)

(73) Assignee: Sequoia Software Corporation, Columbia, MD (US)

( * ) Notice: Subject to any disclaimer, the term of this patent is extended or adjusted under 35 U.S.C. 154(b) by 0 days.

(21) Appl. No.: 09/469,753

(22) Filed: Dec. 22, 1999

(51) Int. Cl.[7] .............................................. G06F 17/00
(52) U.S. Cl. ...................................................... 706/47
(58) Field of Search ........................................... 706/47

(56) References Cited

U.S. PATENT DOCUMENTS

| | | | |
|---|---|---|---|
| 5,623,653 A | 4/1997 | Matsuno et al. ............ | 702/200 |
| 5,701,484 A | 12/1997 | Artsy ......................... | 709/316 |
| 5,778,402 A * | 7/1998 | Gipson ....................... | 707/530 |
| 5,790,977 A | 8/1998 | Ezekiel ....................... | 702/122 |
| 5,799,297 A * | 8/1998 | Goodridge et al. ............ | 707/1 |
| 5,842,195 A | 11/1998 | Peters et al. ................. | 707/1 |
| 5,848,242 A | 12/1998 | Behaghel et al. ........... | 709/218 |
| 5,881,241 A | 3/1999 | Corbin ....................... | 709/239 |
| 5,884,046 A | 3/1999 | Antonov ..................... | 709/238 |
| 6,006,242 A * | 12/1999 | Poole et al. ................. | 707/531 |

OTHER PUBLICATIONS

Park et al, "Intelligent Search Agent for Software Components", IEEE Proceedings of Software Engineering Conference, Dec. 7–10, 1999.*

Kawano et al, "Mondou: Interface with Text Data Mining for Web Search Engine", IEEE International Conference on System Sciences, Jan. 1998.*

Eich et al, "Decision Support in Acute Abdominal Pain Using an Expert System for Different Knowledge Bases", IEEE Symposium on Computer–Based Medical Systems, Jun. 1997.*

He et al, "A Tool for Hypertext–Based System Analysis and Dynamic Evaluation", IEEE Hawaii International Conference on System Sciences, Jan. 1994.*

* cited by examiner

Primary Examiner—George B. Davis
(74) Attorney, Agent, or Firm—Testa Hurwitz & Thibeault, LLP

(57) ABSTRACT

A method and system for determining document content based actions. A rule engine is provided with a document to be acted on, preferably in XML format. The rule engine is also provided with a set of rules and associated actions to be taken upon special conditions. The document is evaluated according to the rules and the document contents; each of the rules is parsed into a parse tree, the document is further evaluated, including, for the provided document, populating the parse tree with at least a portion of the document contents, to create a content-populated parse tree. The portion of the actions to be initiated is selected based on the content-populated parse tree. Actions could include, by way of example, security control or further routing of the document.

36 Claims, 3 Drawing Sheets

METHOD AND SYSTEM FOR CONTENT-BASED DOCUMENT SECURITY, ROUTING, AND ACTION EXECUTION

BACKGROUND OF THE INVENTION

1. Field of the Invention

The present invention relates to a computer-implemented rules engine. More particularly, it concerns a method and system that allows end-users to process documents according to rules, based on the content of documents, and to execute actions, dependent upon how the rules evaluate.

2. Description of the Related Art

While there have been other rules engines, they all rely on meta data. Meta data based rule engines require that documents be pre-processed to obtain the meta data or that meta data be manually specified by an end-user. This meta data is then fed to the rule engine for evaluation.

Thus, a document to be routed according to a conventional system would include, for example, a header containing the data relevant to routing. Further, a document intended to be handled in accordance with certain security rules would include a header containing security-related data. A conventional header would include data related to other actions to be taken (or not taken) on a document.

Pre-processing of the document is used to determine the data or meta data to be placed in a header, or otherwise stored outside of the document contents, but associated with the document. Thus, in routing a document or otherwise action on a document, the pre-processed meta data is principally used.

BRIEF SUMMARY OF THE INVENTION

According to the invention, there is provided a method and system for determining, in a computerized system, document content based actions. A rule engine is provided with a document to be acted on, the document having document content, wherein the document content is defined to include at least one delimited content field, and the document is defined to be in XML format. A rule grammar, including at least one rule operator, at least one constant, and at least one content field, is provided. The rule engine is provided with a set of rules and associated actions to be taken upon special conditions; wherein at least one rule in the set of rules includes at least a specified rule operator, a specified constant, and a specified content field; and a plurality of rule objects, a rule object containing a rule of the set of rules, and referencing one or more next rules to execute based on an evaluation of the document against the rule, and referencing one or more actions to be initiated based on the evaluation;. The document is evaluated according to the rules and the document contents; each of the rules is parsed into a parse tree, the document is further evaluated, including, for the provided document, populating the parse tree with at least a portion of the document contents, to create a content-populated parse tree. The content-populated parse tree is evaluated to a determinant. At least a portion of the actions associated with the rules, the portion of the actions to be initiated is selected based on the determinant.

These and other objects, features and advantages of the present invention are readily apparent from the following drawings and detailed description.

BRIEF DESCRIPTION OF THE DRAWINGS

The invention is described in connection with the drawings, in which.

DETAILED DESCRIPTION OF THE PREFERRED EMBODIMENT

A content based rules engine can evaluate rules based on the content contained within documents without relying on pre-processed data extracted from the document. For example, using the rules engine, a user can write the following rule: 'If the value of the first name field in the document is "john" and the value of the last name field in the document is "doe" then put the document in the Review queue.'

Figure 1:
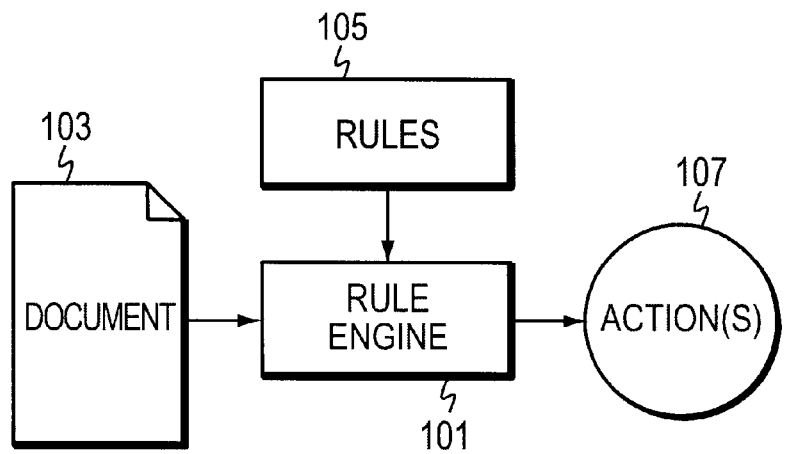
FIG. 1 is a flow diagram illustrating the method and system for content-based document security, routing and action execution.

FIG. 1 illustrates the rule engine's operation in general. The rule engine 101 is supplied with a document 103 to be acted on. Also supplied to the rule engine 101 is a set of rules 105, indicating actions to be take upon certain conditions. One or more actions 107 are then initiated by the rules engine 101.

The rule engine 101 is primed with a set of rules 105, and then for each document 103 processed, it performs a set of actions 107. The document 103 is preferably provided in XML (extended markup language) format.

The rule engine 101 should operate according to a pre-determined rule grammar.

Implementing and operating the rule engine consists of the following.

1.) Determine a rule grammar. The specific grammar chosen is not of importance, so long as boolean operators, constants, and delimited content-fields can be distinguished from one another. It is preferred to use the following rule grammar:

(token $operator$ token) [$operator$ token $operator$ token]

where
    token is either a quoted constant of the form "constant-value" or a % delimited content field of the form %content-field% and
    token is either a quoted constant of the form "constant-value" or a % delimited content field of the form %content-field% and
    operator is one of the following:
        $eq$—equals
        $lt$—less than
        $gt$—greater than
        $le$—less than or equal
        $ge$—greater than or equal
        $and$—logical and operation
        $or$—logical or operation
        $not$—logical not operation
    The tokens and operators could be in a form different from the foregoing.

Table 1 depicts a sample document, highly simplified for illustration purposes, and a valid rule.

TABLE 1

Document:
<xml>
    <fname>john</fname>
    <lname>doe</lname>
</xml>
Rule:
%fname% $eq$ "john" $and$ %lname% $eq$ "doe"

This example is for illustration purposes. The same principles will apply in a document of any size, and a set of rules of any size. Here, the document is in conventional XML format, and thus the fields within the document are delimited.

A rule condition may be an empty set, or a null operator, etc. The rules check conditions.

2.) Define a rule object. The rule object 201 is used to contain a specified rule, to reference the next true rule 207 and false rule 209 to execute if it evaluates to true or false, to reference the next true rule 207 and false rule 209 to evaluate if it evaluates to true or false, to contain a list of true actions 203 to perform if it evaluates to true, and to contain a list of false actions 205 to evaluate if it evaluates to false.

Figure 2:
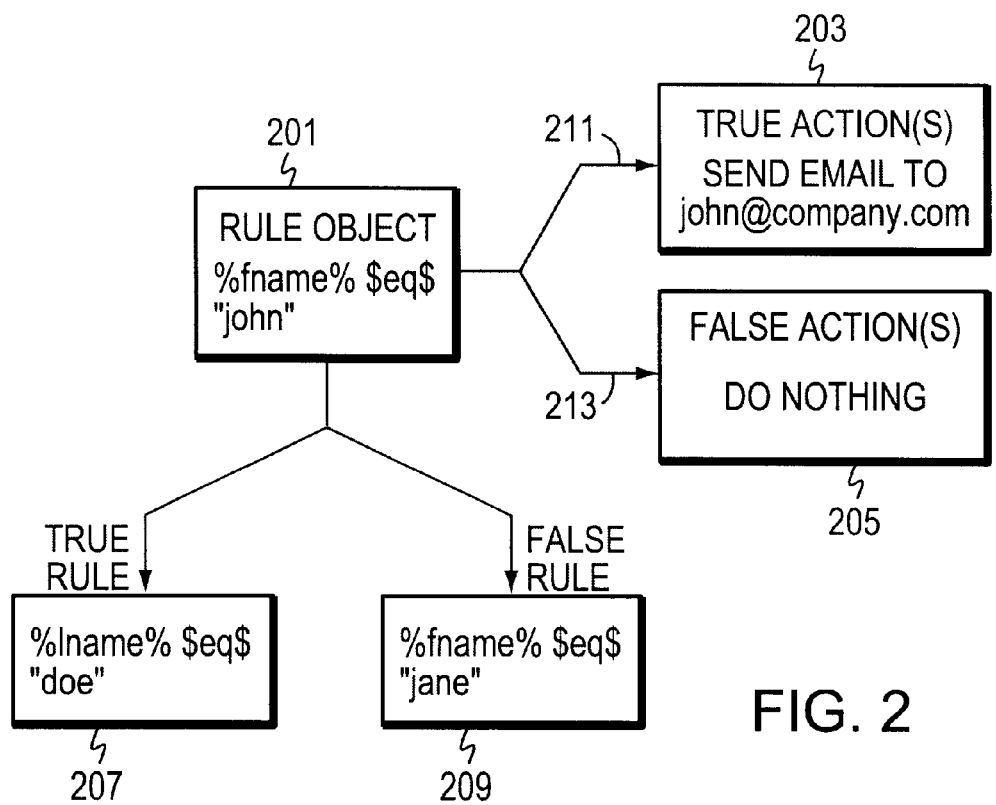
FIG. 2 is a block diagram illustrating a rule object.

FIG. 2 illustrates a rule object. Here, the rule object 201 relates to the example of Table 1. The rule object 201 contains the rule %fname% $eq$ "john". This rule was pre-determined, preferably by a user. The rule object 201 contains, opints to 211, lists, or otherwise indicates one or more true actions 203 to be initiated if the rule, as applied against the document, evaluates to true. The rule object is associated 213 with one or more false actions 205. An appropriate action is a null, or "do nothing". In this example, if the rule evaluates to true, the action is to "send email to john@company.com."

The rule object 201 also references the next rule(2), or rule object, to be executed. In this example, the true rule 207 is %name% $eq$ "doe", and the false object 209 is %fname% $eq$ "jane".

3.) Initialize the Rule Engine. The rule engine 101 (shown in FIG. 1) is provided with a set of rule objects.

4.) Parse the rules. When given a document 103 (shown in FIG. 1) to evaluate, the rule engine 101 will parse the rules into a parse tree. Generating the parse tree may be done in any appropriate manner, such as by commercially available grammar parsers, e.g., "Visual Parser".

Figure 3:
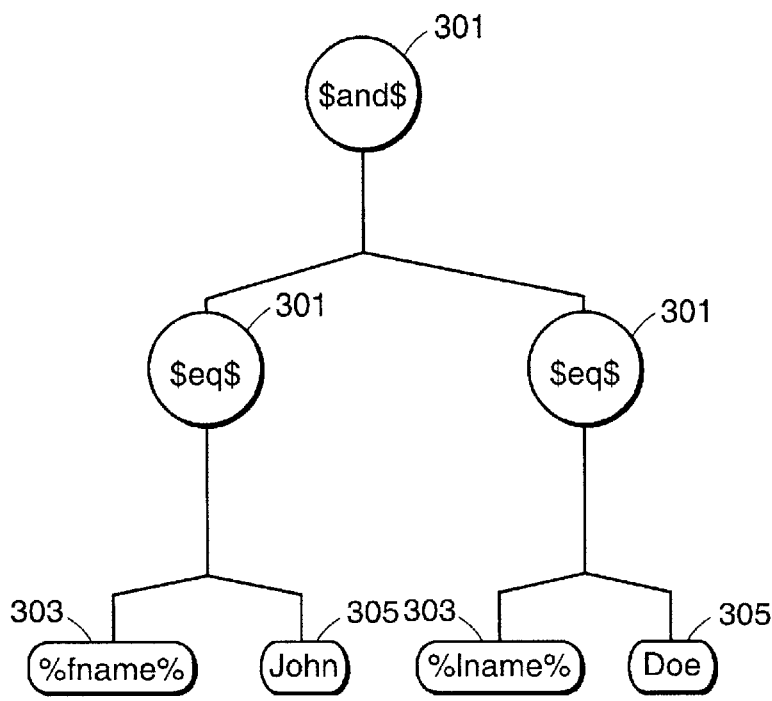
FIG. 3 illustrates and example of the parse tree resulting from parsing a document according to a rule.

The parse tree illustrated in FIG. 3 would result from parsing the rule in Table 1. The tree includes operators 301, content fields 303, and constant values 305. A larger rule would result in a more complex parse tree, There will be one such parse tree contained within each rule object. Thus, a set of rules will result in a set of parse trees, each corresponding to a rule object.

As an alternative to parsing the set of rules each time a document is provided, the rule engine could process the rules and re-use the parse tree for additional documents.

5.) Evaluate Rules. For the provided document, starting with the first rule object, evaluate the parse tree to populate document content values. This advantageously is done by performing a depth-first in order traversal of the parse tree, and for each encountered node which contains a content field, substitute the specified value from the document 307 into the tree.

The provided document has contents including values that belong to an identifiable type. Preferably, the document is in XML format. Thus, the specified value for that type may be readily located within the document contents, in any conventional manner.

Figure 4:
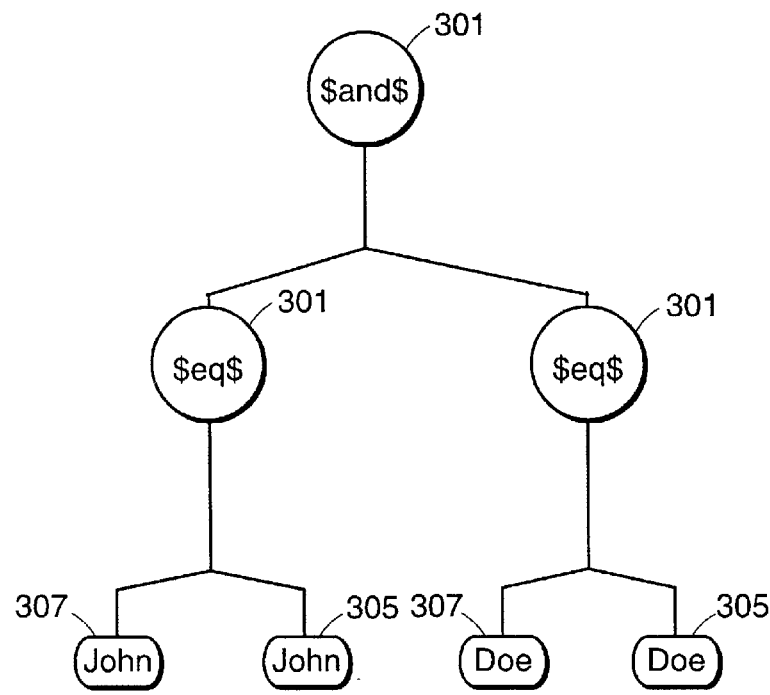
FIG. 4 illustrates the parse tree of FIG. 3, as populated with document contents.

After performing this operation for the rule and document, the content-populated parse tree will be as in FIG. 4.

Once all content fields in the parse tree have been substituted with document values 307, the boolean logic of the rule is evaluated, preferably by performing a depth-first in order traversal of the parse tree. For each encountered node (301, 305, 307) which contains an operator 301, the operator node advantageously is replaced with the result of applying the boolean operation specified. This is discussed in detail below in reference to FIGS. 5a–5c. The ultimate result of evaluating the rule (the content-populated parse tree) is a determinant, preferably a boolean value. One of skill in the art will appreciate other manners in which a parse tree may be evaluated.

6.) Execute Actions. At this point, according to the preferred embodiment, the parse tree will only be a single node of interest, the determinant. The determinant indicates how the rule evaluated. The value of the determinant determines the actions to be executed. In the preferred embodiment, this indicates whether the rule evaluates to true or false. If the rule is true, then the rule engine initiates execution of the configured set of true actions. If the rule is false, then the rule engine initiates the configured set of false actions.

7.) Go to Next Rule. After the actions for the present rule have been executed, the rule engine goes to the next rule associated with the determinant value, if any, and repeats step 5. (Actions are further discussed below.) This process continues until there are no more rules to be processed.

Figure 5A:
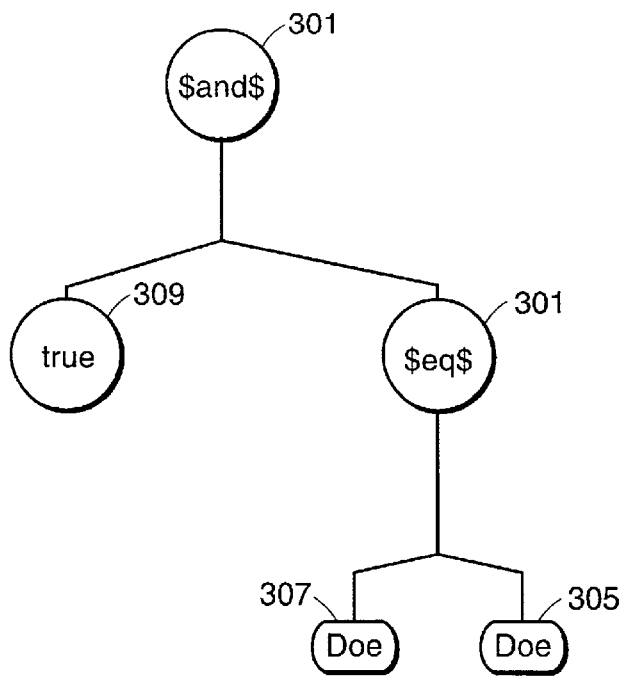
FIGS. 5a,5b and 5c illustrate an in order traversal of the parse tree of FIG. 4.
Figure 5B:
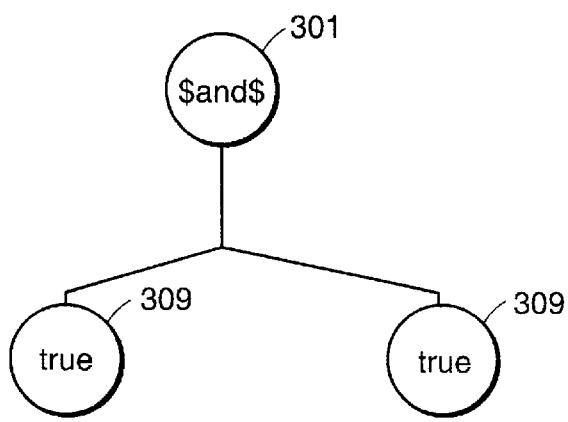
Figure 5C:
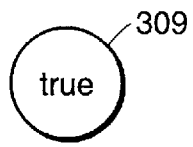

FIGS. 5a–5c show the result of performing the rule evaluation of a content-populated parse tree, by way of reference to the example of Table 1, and the content-populated parse tree illustrated in FIG. 4. In a depth first in order traversal for this example, the document value 307 of John and operator 301 of $eq$ are applied to the constant value 305 of John, and the operation result 309 is true. Advantageously, the operation result 309 replaces the operator 301 node of the parse tree (FIG. 5a). Next, the document value 307 of Doe and operator 301 of $eq$ are applied to the constant value 305 of Doe, and the operation result 309 is true (FIG. 5b). Next, the operation results 309 of true are operated on by operand 301 $and$, and the operation result 309 is true (FIG. 5c).

Actions can be any computing operation. In the presently preferred embodiment, the rule engine initiates security or document routine.

The rule engine may be used to perform content based document security by controlling which operations may be performed by which users on documents. For content-based security, the set of actions preferably includes the following: Grant Read Access, Grant Write Access, Grant Update Access, Grant Delete Access, Grant Search Access, Deny Read Access, Deny Write Access, Deny Update Access, Deny Delete Access, Deny Search Access. Other security actions are also possible. These actions can be implemented in any conventional manner, and can be initiated by the rules engine in any of the usual manners to initiate such actions. When a user tries to perform an operation (e.g., Read, Write, Update, Delete, or search) on a document, the rules engine executes the configured set of security rules to determine if the user is allowed to perform the operation.

The actual implementation of each of the above actions will be well understood by one of skill in the relevant art. In the preferred embodiment, each action sets a boolean variable to either true or false, indicating Grant or Deny.

The engine is also used to perform content based document routing. In the presently preferred embodiment, the following actions are provided: Send Email and Move Document to Queue. Other document routine actions are possible. The rule engine can be invoked, for example, when a document is created or updated, to evaluate document routine rules against that document to determine if the document should be placed in a particular queue or emailed to a user. Other document routing actions are possible, and the above list is not exhaustive.

The implementation of each of the above actions themselves is conventional, as will be understood by one of skill in the art. In the preferred embodiment, commercially available products are used to implement the actions: Send Email is implemented using "Ultimate TCP/IP" from Dundas Software; Move Document to Queue is implemented using "Message Queue" from Microsoft.

Sets of other actions and associated sets of rules may be provided. It is the intention that the principles of the present invention will accommodate other actions and rules. Indeed, the rule engine is sufficiently flexible to accommodate documents in a wide variety of formats, other sets of rules, and other sets of actions. Such is anticipated, and is taught by the foregoing, and is within the spirit and scope of the present invention.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for determining, in a computerized system, document content based actions, comprising the steps of:
   (A) providing, to a rule engine, a document to be acted on, the document having document content and the document is defined to be in extensible markup language (XML) format;
   (B) providing, to the rule engine, a set of rules and associated actions to be taken upon special conditions;
   (C) evaluating the document according to the rules and the document contents; and
   (D) initiating at least a portion of the actions associated with the rules.

2. The method of claim 1, wherein the document content is defined to include at least one delimited content field.

3. The method of claim 1, further comprising the step of providing a rule grammar.

4. The method of claim 3, wherein the rule grammar includes at least one rule operator, at least one constant, and at least one content field.

5. The method of claim 4, wherein the content field is delimited.

6. The method of claim 4, wherein at least one rule in the set of rules includes at least a specified rule operator, a specified constant, and a specified content field.

7. The method of claim 3, wherein at least one rule in the set of rules is in the form of the rule grammar.

8. The method of claim 1, wherein at least one rule is empty.

9. The method of claim 1, further comprising a plurality of rule objects, a rule object containing a rule of the set of rules, and referencing one or more next rules to execute based on an evaluation of the document against the rule, and referencing one or more actions to be initiated based on the evaluation.

10. The method of claim 1, further comprising the step of parsing each of the rules into a parse tree.

11. The method of claim 10, wherein the step of evaluating the document further includes, for the provided document, populating the parse tree with at least a portion of the document contents, to create a content-populated parse tree.

12. The method of claim 11, wherein the step of evaluating the document further includes evaluating the content-populated parse tree to a determinant.

13. The method of claim 12, wherein the portion of the actions to be initiated is selected based on the determinant.

14. The method of claim 1, wherein the portion of the actions to be initiated is selected based on an evaluation of the rule.

15. The method of claim 1, further including processing any next rule in the set of rules.

16. The method of claim 1, wherein the set of actions control security for the provided document.

17. The method of claim 1, wherein the set of actions control routing of the provided document.

18. A method for determining, in a computerized system, document content based actions, comprising the steps of:
   (A) providing, to a rule engine, a document to be acted on, the document having document content, wherein the document content is defined to include at least one delimited content field, and the document is defined to be in extensible markup language (XML) format;
   (B) providing a rule grammar, including at least one rule operator, at least one constant, and at least one content field;
   (C) providing, to the rule engine, a set of rules and associated actions to be taken upon special conditions; wherein at least one rule in the set of rules includes at least a specified rule operator, a specified constant, and a specified content field; and a plurality of rule objects, a rule object containing a rule of the set of rules, and referencing one or more next rules to execute based on an evaluation of the document against the rule, and referencing one or more actions to be initiated based on the evaluation;
   (D) evaluating the document according to the rules and the document contents; parsing each of the rules into a parse tree, evaluating the document further includes, for the provided document, populating the parse tree with at least a portion of the document contents, to create a content-populated parse tree, and evaluating the content-populated parse tree to a determinant; and
   (E) initiating at least a portion of the actions associated with the rules, the portion of the actions to be initiated is selected based on the determinant.

19. A computerized system for determining document content based actions, comprising:
   a rule engine, responsive to a document to be acted on, the document defined to have document content and be in extensible markup language (XML) format; and responsive to a set of rules and associated actions to be taken upon special conditions; for evaluating the document according to the rules and the document contents; and
   an initiation transmission, for at least a portion of the actions associated with the rules.

20. The system of claim 19, wherein the document content is defined to include at least one delimited content field.

21. The system of claim 19, wherein the document is defined to be in XML format.

22. The system of claim 19, further comprising a rule grammar for the rule.

23. The system of claim 22, wherein the rule grammar includes at least one rule operator, at least one constant, and at least one content field.

24. The system of claim 23, wherein the content field is delimited.

25. The system of claim 23, wherein at least one rule in the set of rules includes at least a specified rule operator, a specified constant, and a specified content field.

26. The system of claim 22, wherein at least one rule in the set of rules is in the form of the rule grammar.

27. The system of claim 19, wherein at least one rule is empty.

28. The system of claim 19, further comprising a plurality of rule objects, a rule object containing a rule of the set of rules, and referencing one or more next rules to execute based on an evaluation of the document against the rule, and referencing one or more actions to be initiated based on the evaluation.

29. The system of claim 19, further comprising a parse tree corresponding to each of the rules.

30. The system of claim 29, wherein, during a stage of the evaluation, the parse is populated tree with at least a portion of the document contents, to create a content-populated parse tree.

31. The system of claim 30, wherein, after a stage of the evaluation, the content-populated parse tree evaluates to a determinant.

32. The system of claim 31, wherein the portion of the actions to be initiated is selected based on the determinant.

33. The system of claim 19, wherein the portion of the actions to be initiated is selected based on an evaluation of the rule.

34. The system of claim 19, wherein the set of actions control security for the provided document.

35. The system of claim 19, wherein the set of actions control routing of the provided document.

36. A system for determining, in a computerized system, document content based actions, comprising:

(A) a rule engine, responsive to a document to be acted on, the document defined to have document content, wherein the document content is defined to include at least one delimited content field, and the document is defined to be in extensible markup language (XML) format;

(B) a rule grammar, including at least one rule operator, at least one constant, and at least one content field;

(C) a set of rules and associated actions to be taken upon special conditions, wherein at least one rule in the set of rules includes at least a specified rule operator, a specified constant, and a specified content field; and a plurality of rule objects, a rule object containing a rule of the set of rules, and referencing one or more next rules to execute based on an evaluation of the document against the rule, and referencing one or more actions to be initiated based on the evaluation;

(D) a parse tree populated with at least a portion of the document contents, and a determinant, corresponding to the evaluated content-populated parse tree; and (E) a portion of the actions to be initiated is selected based on the determinant.

* * * * *

UNITED STATES PATENT AND TRADEMARK OFFICE
CERTIFICATE OF CORRECTION

PATENT NO. : 6,532,455 B1
DATED : March 11, 2003
INVENTOR(S) : Paul E. Martin et al.

It is certified that error appears in the above-identified patent and that said Letters Patent is hereby corrected as shown below:

Column 7,
Lines 18-21, should read
30. The system of claim 29, wherein, during a stage of the evaluation, the parse tree is populated with at least a portion of the document contents, to create a content-populated parse tree.

Signed and Sealed this

Thirteenth Day of December, 2005

JON W. DUDAS
*Director of the United States Patent and Trademark Office*